United States Patent [19]

Farrow

[11] Patent Number: 4,480,942
[45] Date of Patent: Nov. 6, 1984

[54] APPARATUS AND METHOD FOR LAYING PIPE

[76] Inventor: Charles T. Farrow, 208 Florence, Jackson, Mo. 63755

[21] Appl. No.: 411,451

[22] Filed: Aug. 25, 1982

[51] Int. Cl.$^3$ .............................. F16L 1/00; B66F 9/00
[52] U.S. Cl. .................................... 405/154; 414/694; 414/910; 405/303
[58] Field of Search .................... 405/154, 303; 299/1; 414/724, 745, 747, 910, 694

[56] References Cited

U.S. PATENT DOCUMENTS

| | | | |
|---|---|---|---|
| 3,542,435 | 11/1970 | Herrmann | 414/724 |
| 3,657,786 | 4/1972 | Wiswell | 414/747 |
| 3,690,492 | 9/1972 | Shore | 414/910 |
| 3,834,566 | 9/1974 | Hilfiker | 414/910 |
| 4,142,763 | 3/1979 | Kumaki et al. | 299/1 |
| 4,273,468 | 6/1981 | Cyfka | 299/1 |

FOREIGN PATENT DOCUMENTS 200181 8/1978 Fed. Rep. of Germany ...... 405/154

*Primary Examiner*—Dennis L. Taylor
*Attorney, Agent, or Firm*—Haverstock, Garrett & Roberts

[57] ABSTRACT

A pipe supporting structure adaptable to be installed for use on machinery such as on a backhoe including an elongated member formed by angularly related portions including a first portion insertable into a pipe section to be supported from one end, the first portion having a pipe engaging member adjacent to the insertable end thereof for engaging the inner surface of the pipe section to be supported at an intermediate location therealong, another pipe engaging member on the elongated member spaced from the aforesaid pipe engaging member for engaging the outer surface of the pipe section adjacent to the end thereof into which the first portion is inserted, and a second portion of the elongated member having a portion thereon for attaching the structure to the machinery on which it is to be installed. The structure also includes apparatus operable for aligning a supported pipe section after it is connected to a previously laid pipe section and to retain the alignment while the supported section is locked into aligned position.

22 Claims, 6 Drawing Figures

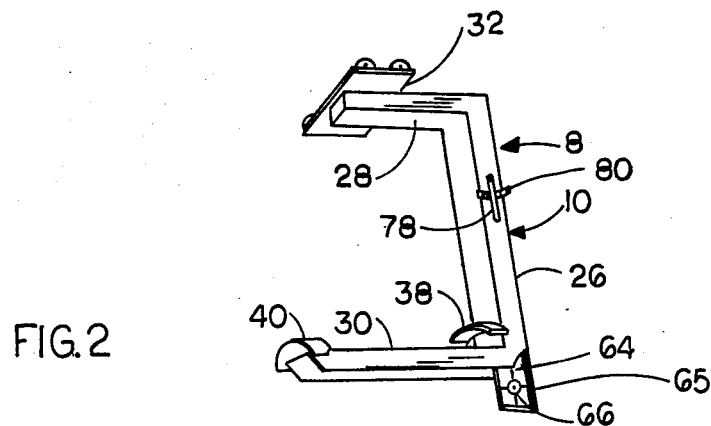
FIG. 2
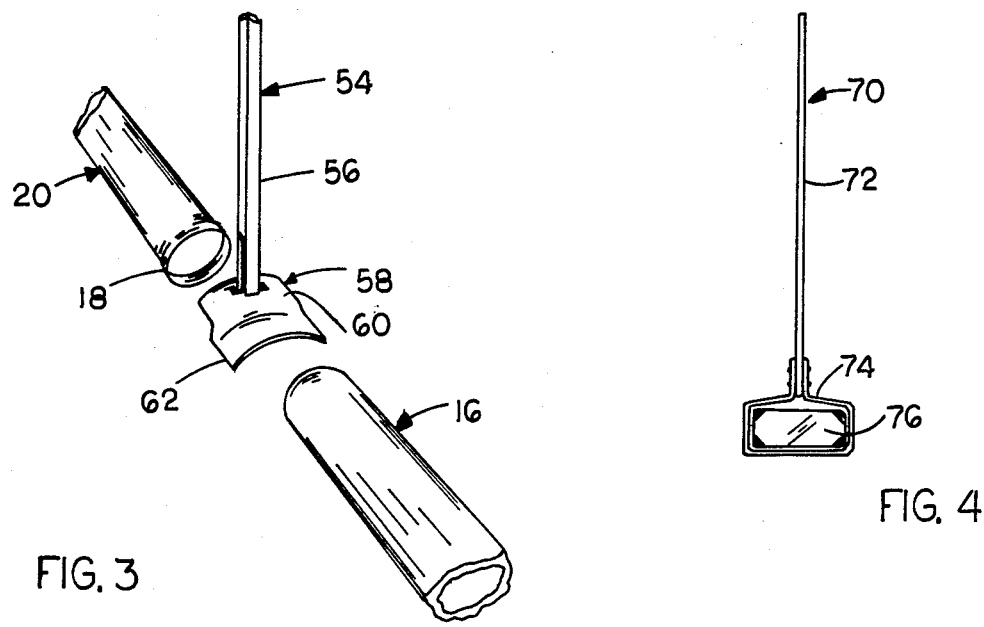
FIG. 3
FIG. 4
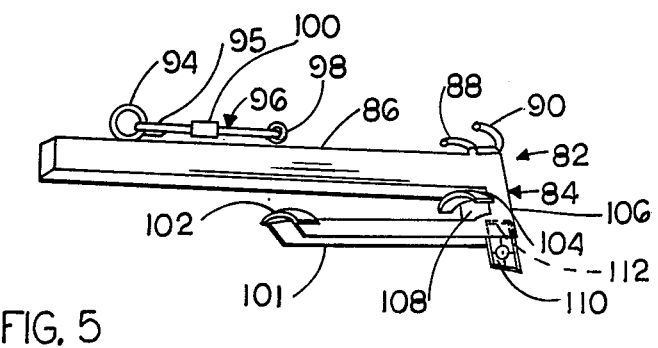
FIG. 5

APPARATUS AND METHOD FOR LAYING PIPE

The present invention relates to an apparatus and method for laying pipe and particularly for laying pipe in trenches from a position outside of the trench or excavation and without requiring that any personnel enter the trench. The present invention resides in means for supporting each new pipe section as it is laid and for lowering it into the trench for accurate alignment and connection to previously laid pipe sections. More particularly, the present invention resides in an arm member attachable to the movable portion of a device such as a backhoe, which arm member has spaced portions for engaging a pipe section at spaced locations therealong and for supporting the pipe section as it is lowered into position in a trench for attachment to and alignment with previously laid pipe sections. The present invention also resides in the provision of novel means for accurately aligning each pipe section as it is laid with respect to previously laid pipe sections and for maintaining this alignment while the newly laid pipe section is then permanently anchored in place by backfilling over a portion of this pipe section. It is important to the present invention to be able to accomplish these purposes without having any persons enter the trench and by minimizing the amount of digging that is necessary in preparing the trench to receive the pipe sections.

Presently it is typically required that personnel be in the trench to place and properly align each pipe section as it is set in position and attached to previously laid sections. To provide the workers with a relatively safe working environment it has generally been required that a relatively wide trench be dug and that the trench walls be sloped and/or shored in order to make entry into the trench relatively safe. As a result, considerable time and effort is consumed in digging and shoring the trench walls, none of which is generally required when laying pipe sections using the present invention. Furthermore, by not requiring personnel to enter the trench, the risk of injury, especially injury due to cave-ins and mishandling of pipe sections is greatly reduced or eliminated and it is also possible to lay much more pipe, on grade, in a given period of time thereby reducing the cost and amount of labor required to lay pipe.

Among the more pertinent known prior art devices is the device for handling pipe sections disclosed in Hilfiker U.S. Pat. No. 3,834,566. The Hilfiker patent shows the use of a pipe support device attached to a backhoe and movable from an operative position at the rear of a backhoe bucket while the bucket is still in place, whereby the device can handle pipe sections to be installed in a pipeline, and the device thereafter moved to an inoperative position so as to avoid interfering with normal movements of the bucket during the excavating operations. The Hilfiker device depends upon its length being at least equal to half the length of the pipe sections being installed in order that the pipe sections can be lifted and handled in the manner set forth in the patent. Therefore, the longer the pipe sections to be laid the more cumbersome will be the handling procedure when using the Hilfiker device. This is not a problem of the present apparatus, however, wherein means are provided for supporting and positioning the pipe sections to be laid from adjacent one end thereof, in a convenient, more positive and easier to handle manner, and in a manner wherein the pipe sections are visible to the operator of the backhoe or other device at all times. This latter provision is important because visibility to the backhoe operator is important for the operator to accurately control the movements of the pipe sections in order to position them for connection to adjacent pipe sections without damaging the connection means or introducing dirt or other foreign matter into the joints between adjacent sections. In addition, the Hilfiker device, as indicated, is mounted on the backhoe bucket in such a manner and position that the operator's view of the area where the device engages the pipe section is restricted and impaired, thus making the pipe handling and alignment operations relatively difficult and awkward. This is not a problem with the present device wherein the pipe sections being handled are always in clear view of the backhoe operator and this is true because with the present construction the support means for the pipe sections are preferably not used with the backhoe bucket in place. Furthermore, the Hilfiker device does not provide any means to align the pipe sections on grade and thus is restricted to laying pipe sections where the grade is not especially important or else requiring personnel to enter the trench to do the aligning. Also, because the Hilfiker device is meant to be used on a backhoe without impairing the excavating functions of the backhoe, it follows that once a pipe section has been set in place, it will be released so that the backhoe bucket can be used for other purposes including addition of bedding and partial backfilling over the newly laid pipe section. Thus, when the Hilfiker device is operated as intended no means are provided to maintain the pipe section in alignment while the pipe section's position is being established and made secure. Even if a second backhoe was employed to place the bedding material and partially backfill over the newly laid pipe section while the first backhoe tried to maintain alignment of the pipe section through the use of the Hilfiker device, problems would still arise in trying to maintain accurate alignment because the Hilfiker device only loosely supports the pipe section since the device engages only the inner surface of the pipe section. The present device can more securely hold and maintain the pipe section in accurate alignment with respect to the previously laid pipe sections during the application of filler materials to support the pipe section in position and during partial backfilling since the present device provides more positive gripping and holding action of the pipe section by engaging both the inner and outer surfaces thereof at spaced locations.

U.S. Pat. Nos. 3,612,700 and 3,742,581 disclose other prior art devices that have been considered and are of some general interest because they show the use of laser beams directed at targets in the alignment of underground pipeline. These devices do not, however, disclose any means or method for supporting pipe sections in position in a trench during alignment and evidently rely on conventional means and methods for digging the trench and installing the pipe sections with the known disadvantages and shortcomings.

The present apparatus overcomes the disadvantages of the prior art by providing means for firmly supporting and precisely positioning pipe sections during installation and alignment. As a result, pipe sections can be laid in less time, with less risk to personnel and with less chance that the pipe ends will be contaminated or damaged by dirt from the trench walls or otherwise with a resultant increase in the possibility that a tight seal will be obtained at the joints between adjacent pipe sections. This can be especially important in the laying of sanitary sewer pipe, water pipe, and pipe for carrying petroleum and gas products where even slight leakage can not be tolerated. In addition, the need for personnel in the trench to aid in joining pipe sections is obviated with the present invention through the use of novel means to support the pipe section as well as to aid in the mating of adjacent pipe sections. Preferably, the present device also includes novel means including novel target means for use with a laser beam and mirror means to accurately align each pipe section on grade as it is set in place without requiring individuals inside the trench to aid in the alignment. However, it is possible to send personnel in the trench strictly to align the pipe section if one should desire to operate the subject device to support the pipe section without utilizing means for accurately aligning the pipe section from a position outside the trench. While this alternative is possible, it is not preferred. Once aligned, each pipe section can be held in alignment by the support means while that pipe section is partially backfilled to fix it in place and thereafter the support means can be withdrawn without disturbing the alignment. Thus, the present invention can entirely eliminate the need for individuals to enter the trench for any purpose, and because of the narrower trench requirements the present device makes it possible to lay more pipe more accurately and in less time, with less equipment, less personnel, less risk to the personnel and with less digging and trench preparation; all of which produces substantial savings in time and money and results in underground pipe that is more accurately laid and aligned.

It is a principal object of the present invention to teach the use of novel apparatus and method for laying pipe in a trench and from a position outside of the trench.

Another object is to make it possible to lay pipe in trenches, including relatively deep trenches, in a manner that is relatively more rapid, safe and inexpensive.

Another object is to greatly reduce the amount of digging and trench preparation required when digging a trench in which to lay pipe.

Another object is to teach apparatus and method for more accurately laying and aligning pipe on grade in a trench from a position outside of a trench.

Another object is to teach a relatively simple, easy to use, and inexpensive apparatus and method for laying pipe in trenches.

Another object is to reduce the time and labor required for accurately laying pipe in a trench.

Another object is to teach the use of apparatus and method for laying pipe in trenches that does not require that anyone enter the trench.

Another object is to teach an improved means for aligning pipe being laid in a trench utilizing laser sighting and target means that can be accurately used by personnel located outside of the trench.

Another object is to provide an apparatus for laying pipe from a position outside of a trench which includes an arm member for mounting on a backhoe having means thereon for firmly engaging and supporting a pipe section so that the pipe section can be precisely maneuvered into position in a trench without anyone in the trench to aid in this operation.

Another object is to provide means for laying pipe sections on grade in a trench from a position outside the trench including means capable of positioning the pipe section on grade and capable of disengagement from the pipe section after the pipe section is aligned and secured by backfilling without disturbing the alignment.

Another object is to teach the use of a guide means that can be used remotely to center and align a pipe section.

Another object is to teach the use of a simple tool attachable and usable with known equipment to facilitate setting pipe sections in position in a trench.

Another object is to make it possible to more accurately and quickly lay pipe sections, a section at a time.

These and other objects and advantages of the present invention will become apparent after considering the following detailed specification of preferred embodiments in conjunction with the accompanying drawings wherein:

FIG. 2 is a perspective view of the preferred embodiment of the pipe support portion of the subject device;

FIG. 3 is a perspective view of a long-handled guide member for use in locating one end of a pipe section being laid relative to the end of a previously laid pipe section;

FIG. 4 is a front elevational view of a long-handled mirror device for use in aligning a pipe section;

FIG. 5 is a perspective view of an alternative embodiment of the present apparatus; and, FIG. 6 is a perspective view showing an alternative embodiment of the present means attached to the bucket portion of a backhoe.

Figure 1:
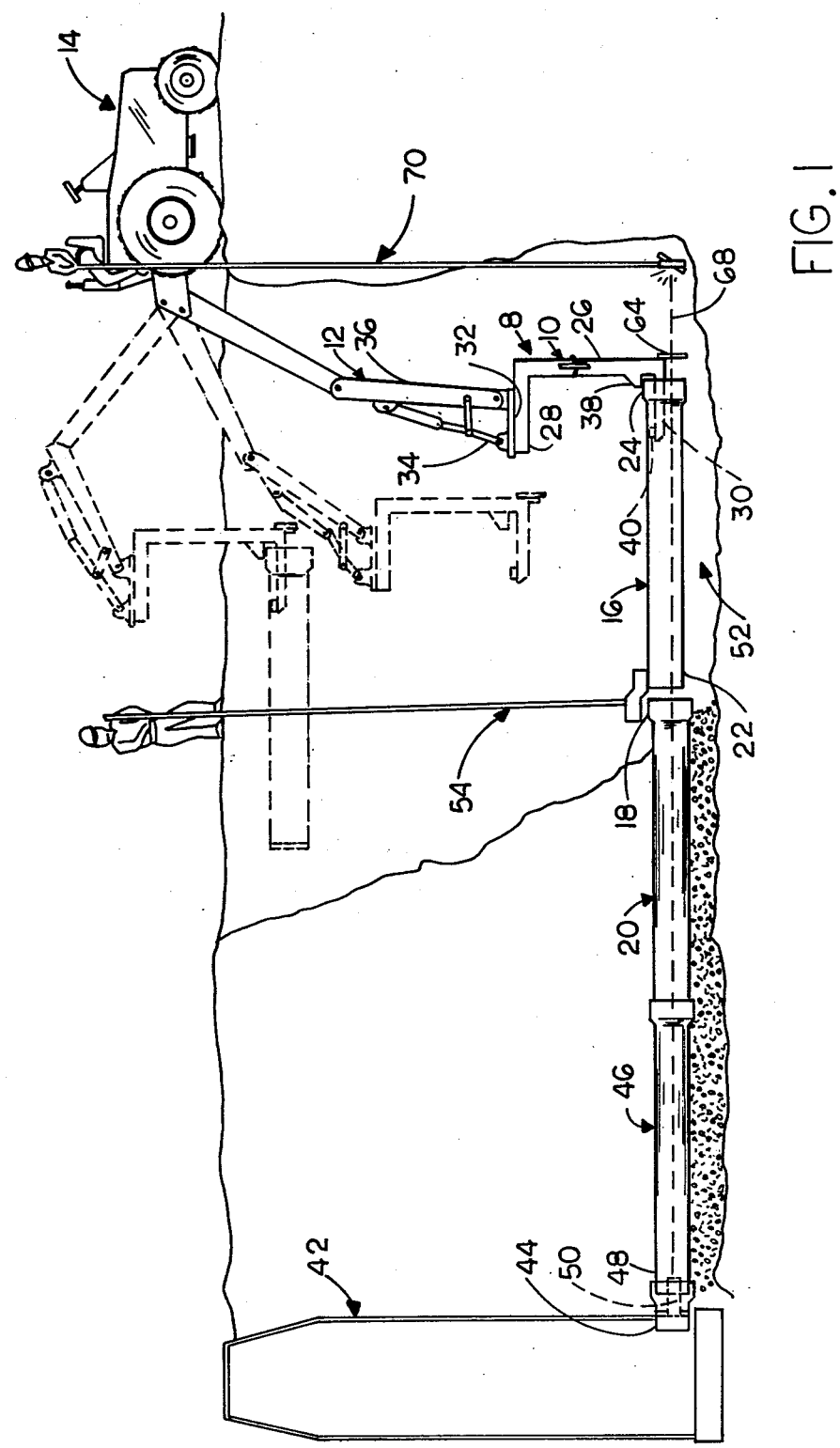
FIG. 1 is a side elevational view of the preferred embodiment of the present apparatus mounted on a backhoe, said apparatus being shown in solid outline and in dotted outline to illustrate different operative positions thereof during the setting in position of a pipe section.

Referring to the drawings more particularly by reference numbers, number 8 in FIGS. 1 and 2 refers to a preferred embodiment of the present device which includes an arm member 10 which is shown attached to the movable portions or linkages 12 of backhoe 14. The arm member 10 is used for engaging sections of pipe such as pipe section 16 as shown, and is used for supporting the pipe section 16 in a substantially horizontal position as it is lowered into a previously dug trench for attachment to the unconnected bell shaped end 18 of the pipe section 20 previously laid. The trench may be dug by the same, but preferably by a different backhoe using a conventional backhoe bucket, and in the usual situation the trench can be dug without requiring any widening or shoring of the side walls because with the present device it is generally not necessary for any personnel to enter the trench. This greatly facilitates the time and effort required to dig the trench and only when a trench is being dug in loose soil or sand may it be necessary to take extra steps in order to prevent cave-ins during the pipe laying operation. In the usual situation, each of the pipe sections 16 will include an elongated tubular portion with a first or spigot end 22 and an opposite end having a bell-shaped portion 24. This is usually the upstream end of the pipe sections and is the end at which the pipe sections are supported.

The arm member 10 as shown in FIG. 1 has a vertical portion 26 which is connected to upper and lower horizontal portions 28 and 30. The upper arm portion 28 is connected to the operating arm linkages 12 of the backhoe 14 by means of a plate 32 which has means thereon for making pivotal attachment to backhoe linkages 34 and 36 of the assembly 12. The linkage assembly 12 on the backhoe may be of conventional construction and is capable of moving between the solid and dotted outline positions shown in FIG. 1. The lower horizontal portion 30 of the arm 10 is the portion that extends into the pipe section 16 usually from the bell end 24 thereof, and a pipe section 16 is normally positioned on the arm 10 when the linkage assembly 12 is in its raised position as shown in dotted outline where it is convenient and accessible. The arm 10 also has a transverse projecting portion 38 which is located and shaped to engage the outer surface of the bell portion 24 of the pipe section 16 mounted thereon when the arm 30 is extending into the pipe section 16. The arm 30 also has an upwardly extending projection 40 formed thereon adjacent to the free end thereof for engaging the inner surface of the pipe section. Alternatively, the projecting portions 38 and 40 need not be formed as part of arm 10 and instead can be separately formed in varying shapes with means to detachably connect to arm 10 wherein the particular shape of the projections that are mounted on arm 10 at any given time is based upon the inner and outer diameter of the particular pipe sections being laid. When a pipe section is positioned on the arm 10 as shown in FIG. 1 the weight of the section will be on the projection 40 and there will be upward pressure on the sidewardly extending projecting portion 38. In this position the pipe section will be firmly supported and will preferably be maintained in a substantially or nearly substantially horizontal position at all times while supported by the arm 10 for reasons which will become apparent hereinafter. In the usual situation the linkage assembly 12 on the backhoe is in a raised position when a pipe section is installed thereon as shown and explained. When it is in this position and the trench in which the pipe section is to be positioned has been properly prepared, the backhoe will be operated in a usual manner to lower the pipe section 16 while maintaining the pipe section in its horizontal position until it is substantially in alignment with the previously laid and anchored pipe section 20 to which it is to be connected.

In order to better understand how the present invention is used and operated in a typical situation it is important to understand that a trench 52 must be prepared using a backhoe or the like and the trench may be dug starting from some particular location such as from the edge of the manhole assembly 42. The manhole 42 has at a suitable depth an outlet fitting 44 which may be of known construction to which the spigot end 48 of a first pipe section 46 is sealably connected. The first pipe section 46 has its spigot end 48 attached to the outlet end of the fitting 44 and a laser light source 50 is mounted in the fitting 44 and has its laser ray oriented to establish the direction in which the pipe section 46, 20, 16, and so on are to be laid. This orientation establishes the inclination of the pipe being laid, and the orientation of the laser beam will be used to orient each pipe section as it is laid in position and backfilled. This means that once the laser beam is oriented it need not be adjusted again until a new direction for laying pipe is needed. This can be done at any time by relocating the laser 50 as required, and once the position of the laser beam is established new pipe sections can be laid using the present invention and without having to have any personnel enter the trench for any reason. After each pipe section is set in place and oriented, the trench 52 will have to be extended to accommodate one or more additional pipe sections. Preferably the extending of the trench will be accomplished using a different backhoe than the backhoe 14 to which the arm device 10 is attached to speed up the operation. As each new pipe section is installed and properly aligned in the trench 52 it will then be fixed in place by using gravel or other means pushed and tamped underneath it and it will be backfilled on top leaving the bell-shaped end 24 and a pipe portion adjacent thereto exposed until the succeeding pipe section has been set in place. When the succeeding pipe section has been set in place and oriented then it will in turn have gravel or other means forced under it and be partially backfilled on top exposing its bell end for attachment to the next succeeding pipe section and so on until the job is done.

The present invention provides means for positioning each succeeding pipe section 16 in position in the trench and supporting it in accurate position while it is aligned and thereafter anchored in position as will be explained. The construction of the arm member 10 is important to the present invention because of the manner in which it is connected to the backhoe preferably without having the backhoe bucket or shovel attached, and because of the manner in which it maintains each pipe section 16 being installed in a horizontal or nearly horizontal position as it is guided into position.

In order to accurately guide the spigot end 22 of the pipe section 16 being connected into the bell-mouth end 18 of the previously laid pipe section it may be desirable to use a special tool such as the tool 54 as shown in FIGS. 1 and 3 which tool includes an elongated handle portion 56 which is preferably constructed of a non-conducting material such as wood. One end of the handle 56 is connected to a pipe engaging tool portion 58 which includes two connected arcuate portions 60 and 62. The arcuate portion 60 has a contour which mates with the outer surface of the bell shaped end portion 18 of the pipe section 20 previously laid and the second arcuate portion 62 has a contour, which is smaller in diameter than the contour of the section 60 to mate with the spigot end portion 22 of the pipe section 16 to be connected to the section 20. The tool 54 can be manipulated by a person standing above and at the side of the trench 52 by positioning the arcuate portion 60 on the bell end 18 of the previously laid pipe section 20 and moving the spigot end 22 of the pipe section 16 being joined into a position where it engages the arcuate section 62. This establishes an alignment of the two pipe sections to be joined but not of the whole pipe section 16, and while pressure is maintained on the two pipe sections using the tool 54 the section 16 that is being supported by the arm 10 on the backhoe 14 can be moved longitudinally into the bell end 18 of the previously laid pipe section. The bell end 18 may have sealing means located therein for sealably engaging and locating the spigot end 22 when the pipe sections are joined and the tool 54 will help to accurately guide the spigot end into sealed condition. As can be seen the shape of the tool portion 58 also overhangs the end portions of two pipe sections to be joined and therefore also helps to keep dirt and other foreign material from entering the connection as it is being made. This is an important advantage especially if the soil of the trench is loose so that the possibility of crumbling or breakoff while the pipe sections are being joined is a possibility. Manipulating the tool 54 and the pipe sections into position for joinder can also cause dirt to be disturbed and fall into the trench. Therefore, it can be seen that the tool 54 serves several important functions including properly aligning the pipe sections while they are being joined and also preventing foreign matter from getting into the joint.

Once the pipe sections have been joined in the manner illustrated, it is important to be able to accurately align the pipe section 16 on grade and to hold and support it in aligned position while it is locked in position by forcing material under the pipe and thereafter backfilling. In order to align the pipe on grade the arm member 10 is provided with a translucent target plate 64 which is attached extending down from or below the lower end of the vertical arm 26. The translucent plate 64 is preferably mounted in a guard frame 65 which protects the translucent plate 64 on the member 26. The translucent target plate 64 has a bullseye 66 (FIG. 2) which is positioned to be in alignment with the longitudinal centerline or axis of the pipe section 16 being supported. As previously noted, the laser 50 is positioned at the end of the first pipe section 46 being laid and has its beam 68 oriented in the direction to establish the centerlines of the pipe sections being laid. Therefore, when orienting the pipe section 16 which is being supported on the arm 10 it is necessary to relocate the bell end 24 such that the light from the laser beam will pass through the bullseye 66 in the plate 64. It is possible to know when this condition exists by direct observation by the operator as the laser beam contrasts in color with the translucent target and bullseye which in most situations can be seen from the operator's seat and in some situations when the operator cannot see the target clearly it is necessary for another person to observe the target either from a better vantage point or by using another long handle tool 70 such as shown in FIG. 4. The tool 70 includes an elongated handle portion 72 which has a bracket 74 attached adjacent one end thereof, and the bracket 74 supports a mirror 76. When the bullseye 66 is accurately positioned as indicated by the laser beam 68 passing therethrough, this condition can be easily detected by a person standing at the edge of the trench 52 holding the tool 70 in a position such that the laser beam will reflect upon the mirror 76 and be redirected upwardly where it can be seen. Once it has been established that the pipe section 16 is properly coupled and oriented, the backhoe maintains the pipe section in this position while gravel or other filler material is forced into the space under the pipe section 16 beginning from where the connection has been made and extending partway along the pipe section toward the bell end thereof. Thereafter the material that has been forced under the pipe section can be tamped into position and additional backfiller material placed over the pipe and tamped if necessary to fix the pipe section in place. It is usually not desirable to backfill the pipe all the way to the bell end thereof until the next pipe section has been coupled thereto. The procedure just described is repeated until all of the desired pipe has been laid. Once a pipe section has been connected, oriented and fixed in place, the operator of the backhoe can release the arm 10 from the pipe section by carefully horizontally moving the arm 10 including especially the arm portion 30 without disturbing the alignment of the section. If necessary, the trench can be extended as required to accommodate the next pipe section to be installed and it is preferable that this be done with another backhoe and not the same backhoe to which the arm 10 is connected. However the digging can be done with the same backhoe but it is usually preferred that the arm be used on a backhoe that does not have a digging bucket also attached as this provides a better view for the operator in making a connection and also in orienting the pipe. As previously indicated all of these operations including the operations of digging the trench, placing the pipe section on the arm 10, lowering the pipe section into position, aligning the pipe ends to be joined and making the coupling, orienting the axis of the pipe and holding the pipe in position while backfilling can be done accurately, quickly and without requiring that any personnel enter the trench for any reason. The advantages of this procedure are obvious.

Referring again to FIG. 2, it should be noted that the lower horizontal arm portion 30 should preferably be made to be concave on its lower side as shown so that there will be minimal possibility of interference with the passage of the laser beam therethrough, and the member 40 which is attached adjacent to the free end of the arm 30 should preferably be rounded as shown in FIG. 2 to distribute its load carrying force over a large area of a pipe section being supported thereby. In like manner, the projection 38 on the arm 10 should be rounded to mate with the outer surface of the bell end 24 of a pipe section being supported. Both of these pipe engaging portions can also be covered or coated with a cushioning material such as a plastic or rubber-like cushioning material to minimize possible damage to the sections engaged thereby.

It may also be desirable to have means located on the vertical arm portion 26 to indicate the vertical orientation thereof. Such means may include a hinged free swinging arm or pendulum 78 as shown in FIG. 2 which cooperates with an arcuate scale 80 which is in view of the operator of the backhoe. The position of the pendulum 78 relative to the scale 80 can then be used by the backhoe operator to maintain the arm portion 26 in a substantially vertical position, or in some other desired orientation during the operation of the backhoe. This is an aid in maintaining proper orientation of the pipe section during movements thereof and of the arm 30 as the sections are lowered and manipulated into position, and it also provides an indication of the orientation of the arm 10 as it is withdrawn from each section at the conclusion of each laying in place operation. However, the pendulum means will generally not provide an accurate enough means for final alignment of the pipe sections as is provided by the laser means described above.

Other means can also be used in association with the subject alignment means to sense when the pipe section 16 being laid is in alignment as determined by the position of its bell end portion relative to the laser beam. Such other means may include a light sensitive device such as a photovoltaic cell or like device capable of producing an electric response to indicate when the pipe is properly aligned. If such is used it will obviate the need for using the mirror device 70 described above. If a photovoltaic cell is used it can be mounted on the target plate and the need for having a bullseye on the target plate such as the bullseye 66 will not be necessary. Alternatively, closed circuit camera means could be utilized to monitor the position of the laser beam but this only increases the cost without providing an equivalent benefit in accuracy.

Although the preferred embodiment of the present device calls for removing the bucket portion from the backhoe to which the arm 10 is to be attached in order to improve the operator's visibility, there may be situations or reasons that make this impractical or impossible for some reason such as the unavailability of a second backhoe. If this is the case then the use of a device such as a photovoltaic cell or like sensor may be even more helpful to enable the backhoe operator to function with precision even with the bucket in place. Generally, however, this is not the preferred way to operate.

FIG. 5 shows an alternate embodiment 82 of the subject device which includes an arm structure 84 which is constructed to be attached to the bucket portion of the backhoe while the bucket portion is in place. In this construction the pipe support structure 84 is modified so that it can be attached to the backhoe bucket while it is in place. The arm structure 84 like the structure 10 is for supporting a pipe section such as the pipe section 16 and is used in a manner very similar to the arm structure 10. However, since the device 82 is to be attached to the backhoe bucket it is modified somewhat so that the bucket can also be used for excavating operations as well. When attached to the bucket the arm structure 84 is used to support the pipe sections as they are manipulated in place and attached and aligned in manner somewhat similar to that described above.

Figure 6:
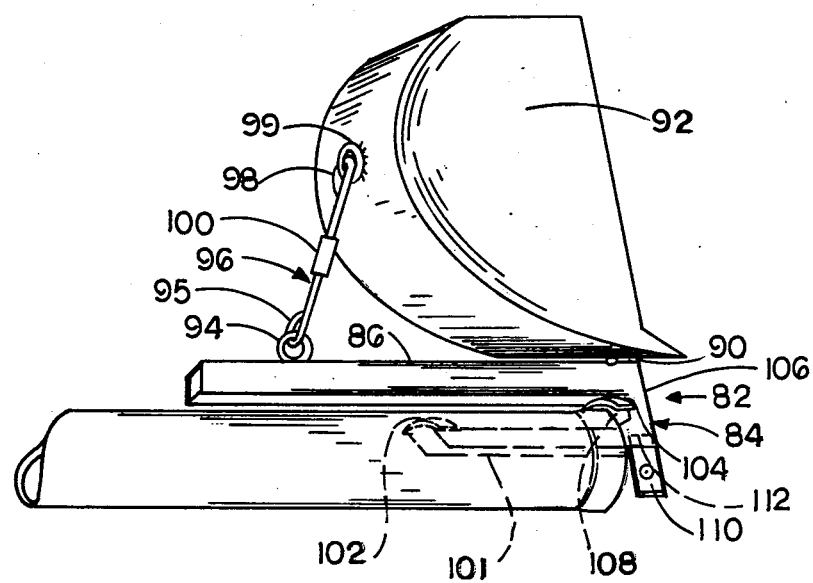

The arm structure 84 includes an arm portion 86 which has a pair of hook members 88 and 90 attached on opposite sides and adjacent to one end thereof. The hook members 88 and 90 are positioned to engage the digging edge portion of a backhoe bucket 92 as shown in FIG. 6. Adjacent to the opposite end of the arm 86 is a ring member 94 to which one loop end 95 of a rod member 96 is pivotally connected. The rod 96 has an opposite loop end 98 which can be swung to position for attaching to means such as to a member 99 welded or otherwise attached to the bucket 92. In this way the arm structure 84 can be attached to the bucket 92 and suitable means such as rod shortening means or turnbuckle 100 can be provided in the rod 96 to tighten the structure 84 in place on the bucket 92.

The structure 84 includes a second lower arm member 101 which is shown being substantially parallel to the arm 86. The arm 101 may be similar in construction to the arm 30 including being of hollow construction and having a pair of spaced arcuate shaped portions 102 and 104 which are located to engage spaced locations on the inner and outer surfaces of a pipe section to be supported thereby. The arms 86 and 101 are connected by a transverse portion 106 located at one end of the device, and the device 82 may include a stop wall such as wall 108 against which the end of a pipe section is positioned when installed to limit its movement onto the arm 101 and to provide a surface for use in forcing a supported pipe section into coupled connection with a previously laid pipe section. Except for the fact that the construction 82 is used by attaching it to the bucket portion of the backhoe, it is structurally and operationally similar to the construction 8 described above and is used for the same purposes. It is recognized, however, that the manner in which the construction 82 is attached to the bucket may to some extent limit the visibility of the operator in manipulating a pipe section being supported and this can become a problem especially if the pipe is being installed in a relatively deep trench. However, for some situations including situations where only one backhoe is available, the construction 82 may be adequate. The construction 82 will also have a target plate 110 similar to the target plate 64 which is used for alignment purposes. The target plate 110 is shown hinged at 112 to swing up into the channel formed by the arm 101 for protection.

It is the usual practice to have the support arm extend into the pipe section from the bell end. However, it is recognized that there may be situations where the spigot end of the pipe section is the end that is to be supported and the present devices are able to accommodate such although some modifications in the shape of the pipe engaging members may be desired in this case.

The present device can also be used to lay many different kinds of pipe sections and in trenches of various depths. For example, it can be used to lay sections of sewer pipe, water pipe, the pipes that carry petroleum and gas products and pipes and conduits used for other purposes as well. When laying certain types of such pipe sections it is important that the sealing means between the ends of adjacent sections make a good leakproof seal therebetween, and there are available pipe constructions which make this possible and which are able to be handled and manipulated using a device such as the present device and without requiring applying any sealer to the pipe ends once they are positioned in the ground and connected. It is contemplated, however, that there may be situations where some additional sealer may be required, and in such cases it is preferred that it be applied by a person operating from ground level. It is also expected that the arcuate pipe engaging portions of the subject constructions can be changed to accommodate pipes of different diameter.

It is also preferred to have the handle portions of the auxiliary tools 54 and 70 formed of non-conductive material such as wood or plastic to prevent injury should they come in contact with an overhead or underground power line or the like.

Thus, there has been shown and described several embodiments of a novel apparatus and method for laying pipe in aligned underground condition. It will be apparent to those skilled in the art, however, that many changes, modifications, variations, and other uses and applications of the subject apparatus and method are possible and all such changes, modifications, variations, and other uses and applications which do not depart from the spirit and scope of the invention are deemed to be covered by the invention which is limited only by the claims which follow.

What is claimed is:

1. A pipe supporting structure adaptable for use on machinery having a movable portion, said structure being attachable to such machinery so as to be used to support a pipe section having inner and outer surfaces while it is moved into position and manipulated for attaching to another pipe section, said structure including an elongated member formed by angularly related arm portions including a first arm portion insertable into the pipe section to be supported from one end, said first arm portion having means thereon for engaging the inner surface of the pipe section to be supported adjacent the upper portion of the inner surface thereof, other means on the elongated member spaced from the means for engaging an upper portion of the inner surface of the pipe section for engaging the upper outer surface of the pipe section adjacent to the one end thereof, said upper outer surface engaging means being spaced from said upper inner surface engaging means such that the distance therebetween is less than half the length of the pipe section to be supported, a second arm portion of the elongated member having means thereon for attaching to the machinery for moving same, and means connecting said first and second arm portions including means to engage one end of the pipe section when said one arm portion is moved therein to limit penetration of said one arm portion.

2. An apparatus attachable to movable linkage portions of machinery such as a backhoe to be used to support elongated pipe sections during positioning thereof and attachment to previously laid pipe sections, each pipe section being laid having an inner and an outer surface and spaced opposite ends, comprising a support member having spaced first and second arm portions one of which is adapted to be positioned extending into a pipe section to be supported thereby from one end, means connecting the first and second arm portions including means to engage the said one end of the pipe section when said one arm is moved therein to limit penetration of said one arm, spaced first and second pipe engaging elements attached to said support member, said first element being attached to the one arm portion in position to engage the inner surface of a pipe section being supported thereby adjacent to an upper surface portion of said inner surface and said second element being positioned on the means connecting the first and second arm portions to simultaneously engage the upper outer surface of the pipe section adjacent to said one end thereof, the distance between said first and second elements being less than half the length of the pipe section to be supported so that the pipe section will be supported in a cantilevered manner extending from said means connecting outwardly along the first arm portion, and means on the second arm portion for attachment to the movable linkage portions of a backhoe.

3. The apparatus of claim 2 wherein the one arm portion is channel shaped in cross-section along the length thereof.

4. The apparatus of claim 2 including means for aligning the pipe section being supported with previously laid and aligned pipe sections including means for generating a laser beam oriented to establish a line of sight for the pipe sections being laid, target means attached to the support member including means for indicating when the laser beam is in proper position relative to the target means as determined by the position of the pipe section being supported relative to previously laid pipe sections.

5. The apparatus of claim 4 wherein said target means includes a plate member with an orifice therethrough which is located therein to be aligned with the line of sight established by the laser beam.

6. An apparatus for attaching to the movable portions of an earth digging machine for use in supporting, positioning and aligning pipe sections having inner and outer surfaces and spaced opposite ends on grade in a trench and in alignment with previously laid pipe sections comprising a pipe engaging member having first and second connected arm portions each having opposite ends, the first arm portion having means mounted thereon adjacent to one end thereof for engaging the inner surface of a pipe section to be supported thereby adjacent to an upper surface portion of said inner surface extending into the pipe section from one end thereof, other means on the pipe engaging member being in position to engage an upper portion of the outer surface of the pipe section adjacent to the pipe end into which the first arm portion is inserted, said means for engaging an upper portion of the outer surface being spaced from the means for engaging the inner surface such that the distance therebetween is less than half the length of the pipe section to be supported, means to engage the one end of the pipe section into which the first arm portion is inserted to limit penetration of said first arm portion, and means on the second arm portion for attaching the pipe engaging member to the movable portions of the earth digging machine.

7. The apparatus of claim 6 including means for centering the free end of the supported pipe section with the end of a previously laid pipe section to which the supported section is to be connected.

8. The apparatus of claim 7 wherein the centering means includes a tool having an elongated handle portion and a pipe section engaging member attached to one end thereof, said pipe section engaging member including a member having a first portion contoured to intimately engage the supported pipe section adjacent to the free end thereof and a second portion contoured to simultaneously intimately engage the end of pipe section to which the supported pipe section is to be joined to establish alignment between adjacent ends of pipe sections to be joined.

9. An apparatus for attaching to a machine having a portion capable of being moved in vertical and horizontal planes for setting in place and connecting together elongated pipe sections having inner and outer surfaces and spaced opposite male and female end portions, comprising a machine having a portion capable of motion in vertical and horizontal planes, a pipe engaging member having a first portion for attaching to the movable machine portion and a second elongated arm portion having a cross sectional size to enable it to be inserted into a pipe section to be supported thereby and having means attached thereto adjacent the end thereof to be inserted into the pipe section for engaging the inner surface of the pipe section adjacent to an upper surface portion of said inner surface, other means mounted on the pipe engaging member for engaging one end of the pipe section into which the second arm portion is inserted to limit penetration thereof into the pipe section and to enable applying longitudinal pressure to the supported pipe section in a direction to connect it to a previously laid pipe section, other means on the pipe engaging member spaced from the means for engaging the upper inner surface of the pipe section for engaging an upper portion of the outer surface of the pipe section adjacent to the one end thereof, the distance between the means engageable with the inner and outer surfaces of the pipe section being less than half the length of the pipe section to be supported, and means on the pipe engaging member forming a target which is positioned thereon in alignment with some predetermined location defined within the space that extends through the pipe section.

10. The apparatus of claim 10 wherein the means on the pipe engaging member for engaging an upper portion of the inner surface of the pipe section includes a member having a covering layer formed of a cushioning surface.

11. The apparatus of claim 9 wherein the second arm portion has a substantially C-shaped cross-section.

12. The apparatus of claim 9 including means for producing a laser beam extending through the pipe section being laid to establish the desired predetermined location therethrough, said target having means located thereon at the predetermined location of the pipe section supported thereon to establish alignment of each supported pipe section as it is connected to a previously laid pipe section.

13. The apparatus of claim 12 including means for observing when the laser beam intersects the means on the target for establishing the predetermined location.

14. The apparatus of claim 9 including means for centering one end of the supported pipe section with the end of the previously laid pipe section to which it is to be connected, said centering means including a member having a first portion engageable with the one end of the supported pipe section and a second portion for simulataneously engaging the previously laid pipe section adjacent to the end thereof to which the supported pipe section is to be connected.

15. The apparatus of claim 14 wherein the first and second portions of the means for centering includes a member having arcuate shaped pipe engaging surfaces that conform to the contour of the outer surfaces of the respective pipe sections to be connected adjacent to the ends thereof, and handle means attached to the said member.

16. The apparatus of claim 9 wherein the machine on which the subject apparatus is attached is a backhoe.

17. The apparatus of claim 16 including means for attaching the pipe engaging member to the digging bucket of a backhoe.

18. The apparatus of claim 9 wherein the means attached adjacent to the end of the second arm portion for engaging the inner surface of a pipe section to be supported has a surface contour that corresponds to the surface contour of the inner surface of the pipe section.

19. The apparatus of claim 9 wherein the other means mounted on the pipe engaging member for engaging the outer surface of the pipe section has a contour that conforms to the contour of the pipe section adjacent to the end thereof.

20. The apparatus of claim 9 wherein the target includes a translucent plate with a bullseye image thereon, frame means extending around the plate, and means hingedly attaching the target to the pipe engaging member for angular movement between an operative position angularly related to the second arm portion and a position adjacent to the second arm portion.

21. A method for installing pipe sections in a trench comprising the steps of providing a machine having a support portion movable in horizontal and vertical planes between a position above the ground and a position extending down into the trench where pipe sections are to be laid, attaching to the movable support portion of the machine a pipe supporting structure having means for entering the pipe to be supported and including first means thereon for engaging an upper portion of the inner surface thereof and second means on the pipe supporting structure for simultaneously engaging an upper portion of the outer surface of the pipe section being supported adjacent to the end into which the means for entering is inserted, the distance between the first pipe section engaging means and the second pipe section engaging means being less than half the length of the pipe section to be supported, lowering a pipe section being supported on the support structure into a trench for attachment to another previously laid pipe section, connecting one end of the lowered pipe section to the adjacent end of the previously laid pipe section, and while one end of the pipe section being supported is connected to the previously laid pipe section manipulating the opposite end of the supported pipe section to establish a predetermined alignment condition therefor and backfilling the supported pipe section so that the pipe section is supported by the surrounding earth, and thereafter withdrawing the inserted means on the support structure from the pipe section.

22. The method of claim 21 wherein the alignment step includes providing a target on the pipe supporting structure, establishing a laser beam that extends through the laid pipe sections, and moving the supported and connected pipe section to a position so that the target on the pipe supporting structure is intersected at a predetermined location by the laser beam to establish orientation thereof.

* * * * *

UNITED STATES PATENT OFFICE
CERTIFICATE OF CORRECTION

Patent No. 4,480,942　　　　　　　　Dated November 6, 1984

Inventor(s) Charles T. Farrow

It is certified that error appears in the above-identified patent and that said Letters Patent are hereby corrected as shown below:

In claim 10, column 12, line 51, delete the number "10" and substitute therefor the number --9--.

Signed and Sealed this

Thirtieth Day of April 1985

[SEAL]

Attest:

DONALD J. QUIGG

Attesting Officer　　　Acting Commissioner of Patents and Trademarks